(No Model.)
W. HEATON.
POST HOLE DIGGER.
No. 387,640. Patented Aug. 14, 1888.
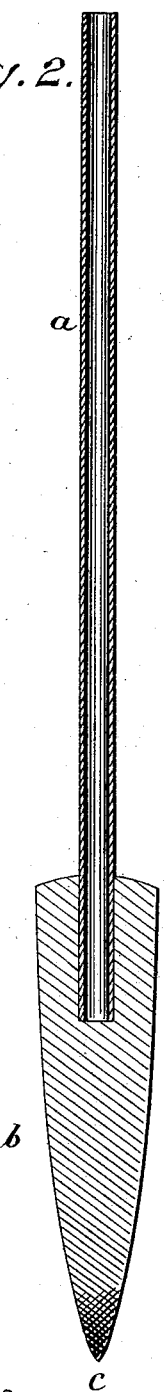
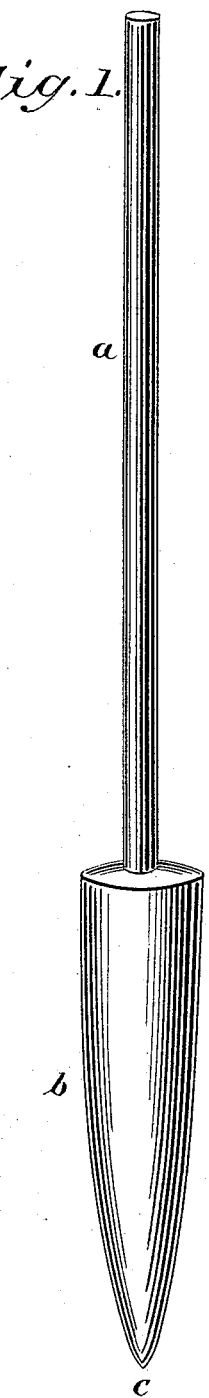
WITNESSES,
H. C. Newman,
E. S. Newman,
INVENTOR,
Warren Heaton,
By his Attorneys
Baldwin, Davidson & Wight.

UNITED STATES PATENT OFFICE.

WARREN HEATON, OF NEOSHO, MISSOURI, ASSIGNOR OF ONE-HALF TO JOHN C. ALEXANDER, OF SAME PLACE.

POST-HOLE DIGGER.

SPECIFICATION forming part of Letters Patent No. 387,640, dated August 14, 1888.

Application filed June 1, 1888. Serial No. 275,726. (No model.)

*To all whom it may concern:*

Be it known that I, WARREN HEATON, a citizen of the United States, residing at Neosho, county of Newton, and State of Missouri, have invented certain new and useful Improvements in Post-Hole Diggers, of which the following is a specification.

The object of my invention is to provide a strong and durable implement for digging post-holes.

To this end my invention consists in forming the handle of the implement of gas-pipe and the digging end of an enlarged conical head of cast-iron united to the handle in the process of casting and having its point chilled to render it hard and durable. By this construction the handle, while possessing the requisite strength, is light and inexpensive; the digging end or head, being of cast-iron, is cheap, and, being tapered or conical, readily pierces the ground and forces the earth out of the way laterally. The extreme end or point of the head, being hardened, will readily cut through hard soil, gravel, and rock, so as to open an entrance to allow the tapered head to enter.

The chief merit of the implement is its simplicity. There are only two parts—viz., the handle and the conical head. The handle is secured to the conical head by simply inserting the end of the handle in the mold in which the head is cast and then casting the head upon and around the end of the handle. The end of the conical head is hardened by chilling it while still in the mold.

In the accompanying drawings, illustrating my invention, Figure 1 is a side elevation of my improved post-hole digger, and Fig. 2 is a vertical central section of the same.

The handle $a$ is made of a single section of gas-pipe of any desired length. The working end or head $b$ is of cast-iron, being conical in shape, with its point down and its upper end rigidly secured to the handle $a$. The head $b$ is cast in a mold into which the end of the pipe $a$ is inserted, so that when set the metal will be shrunk around the end of the pipe and adhere firmly to it. No additional fastening is required, so I thus avoid the necessity of drilling the head or the handle for the insertion of bolts or rivets or other fastening devices.

The point $c$ of the conical head is hardened by a chilling process so as to render it strong and durable. The conical head $b$ tapers gradually, so that as the implement is successively raised and let fall it will force the earth out laterally instead of driving it ahead of the implement.

It is not intended that the implement should be driven into the ground; but the work is done by successively raising it in the air and letting it fall so as to do the work by its own weight and momentum.

Having thus described my improved post-hole digger, what I claim as new, and desire to secure by Letters Patent of the United States, is—

The combination, substantially as hereinbefore set forth, of the gas-pipe handle, and the conical cast-iron head cast upon and around the end of the pipe and having its end or point chilled to render it hard and durable.

In testimony whereof I have hereunto subscribed my name.

WARREN HEATON.

Witnesses:
B. J. MORROW,
E. L. LOGAN.